S. C. WILT.
Insect-Destroyer.
No. 4,808.
Patented Oct. 7, 1846.
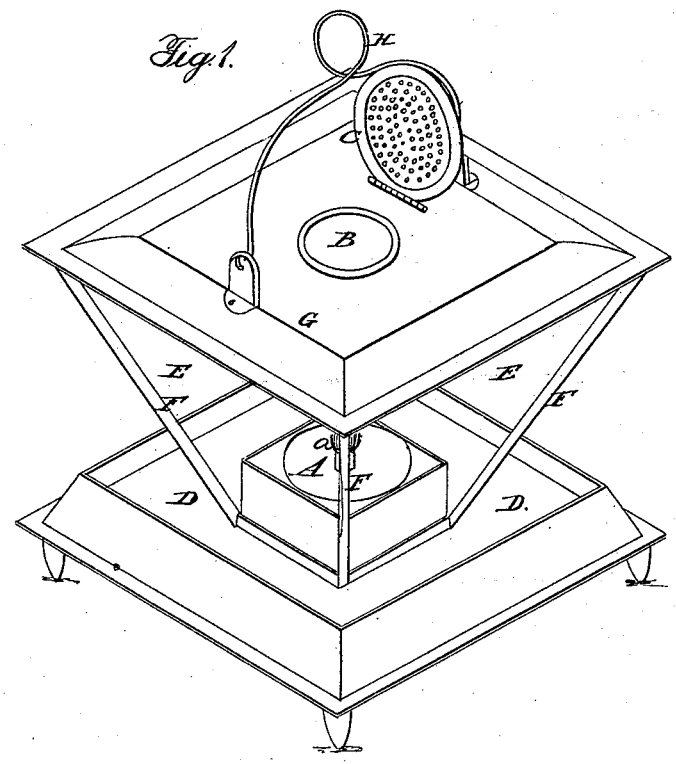
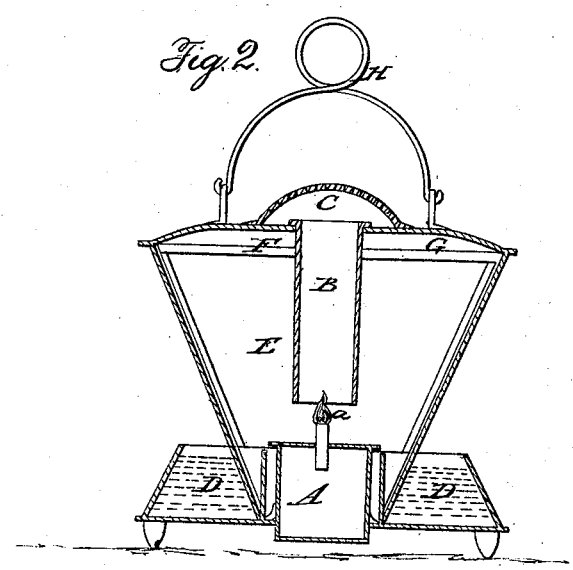

UNITED STATES PATENT OFFICE.

SAML. C. WILT, OF HARTLETON, PENNSYLVANIA.

IMPROVEMENT IN LANTERNS FOR DESTROYING INSECTS.

Specification forming part of Letters Patent No. 4,808, dated October 7, 1846.

*To all whom it may concern:*

Be it known that I, SAMUEL C. WILT, of the town of Hartleton, in Union county, and State of Pennsylvania, have invented a new and Improved Lantern for the Destruction of the Bee-Moth and other Night Flying Insects; and I do hereby declare that the following is a full and exact description.

The nature of my invention consists in the combination of a lantern provided with a surrounding open basin filled with oil or any other fluid for the purpose to drown and destroy such night-flying insects which may be attracted by the bright shine of the lamp or candle.

To enable others skilled in the art to make and use my invention, I will proceed to describe its construction and operation, reference being had to the annexed drawings, making a part of this specification, in which—

Figure 1 is a perspective view of said lantern; A, the lamp, and *a* the flame; B, the chimney, being of glass or tin, as circumstances may require; C, a perforated cap to cover the chimney B; D, reservoir or basin for oil or any other fluids; E, inclined glass case surrounding the lamp; F, the frame of said glass case; G, the top cover of said case, and H a handle on which to carry the lantern from place to place or to hang the same stationary.

Fig. 2 represents the same lantern, but in a perpendicular section.

The same letters are used on the same parts of the lantern in Fig. 1 and Fig. 2.

The operation of said lantern is as follows: The lamp A *a*, or a candle, being lighted, the chimney B inserted from above in its place, the perforated cover closed over the opening of the chimney, (to prevent that the wind may not disturb the flame of the lamp A,) and the reservoir or basin D filled with oil or any other fluid, the lantern is ready for use.

The said lantern may be set or fixed to a post or tree in the neighborhood of the bee-hives. The bee-moth and other night-flying insects will be attracted by the bright shine of the flame, take their flight toward it, and, in their course meeting the oblique surface of the glass case E, descend and surely tumble into the basin D, filled with oil for their destruction.

The said bee-moth lantern may also be used to great advantage and success to destroy the troublesome mosquitoes and gnats in houses or near them in open places. Should the lamps in the streets be provided with my invention, a whole city may be cleared in a few evenings of gnats, &c., and other night flying insects troublesome to man.

In tobacco-plantations said lantern would be the surest remedy to prevent the appearance of the destructive caterpillar. If the said lantern is used in orchards in season, the night-butterfly would be destroyed before the eggs be deposited, and the orchard saved. In short, the bee-moth lantern, if regularly in common use, may clear a whole country of the destructive orchard-caterpillar, and save tobacco-plantations and bee-nurseries.

It may be further to remark that said lantern is the surest trap to destroy the blue blow-fly so annoying in butcher-stalls and other places where meat is to be exposed to open air. If a piece of putrid meat be hung into the inside of the glass case E, the smell will attract the blowfly from a distance, and in endeavoring to get into the inside will fall in the basin with oil and be destroyed. This is done by daytime without the assistance of a lamp.

What I claim as my invention, and desire to secure by Letters Patent, is—

The combination of the lamp A, the surrounding funnel-shaped glass case E, in combination with the open reservoir or basin D, filled with oil or any other fluid, and the chimney, which is inserted from above with the cover, for the use and purpose to destroy bee-moth and other night flying insects, as set forth in the specification and represented in the drawings.

S. C. WILT.

Witnesses:
 PETER VON SCHMIDT,
 S. A. PEUGH.